United States Patent
Carey

(10) Patent No.: US 10,145,015 B2
(45) Date of Patent: Dec. 4, 2018

(54) HYDROGEN GENERATING SYSTEM AND METHOD USING GEOTHERMAL ENERGY

(71) Applicant: Jeffrey M. Carey, Hayward, CA (US)

(72) Inventor: Jeffrey M. Carey, Hayward, CA (US)

(73) Assignee: Marine Power Products Incorporated, Pullman, WA (US)

( * ) Notice: Subject to any disclaimer, the term of this patent is extended or adjusted under 35 U.S.C. 154(b) by 583 days.

(21) Appl. No.: 14/095,765

(22) Filed: Dec. 3, 2013

(65) Prior Publication Data

US 2014/0150448 A1    Jun. 5, 2014

Related U.S. Application Data

(60) Provisional application No. 61/733,868, filed on Dec. 5, 2012.

(51) Int. Cl.
| | | |
|---|---|---|
| C25B 1/04 | (2006.01) | |
| C01B 5/00 | (2006.01) | |
| C01B 3/02 | (2006.01) | |
| F01K 25/00 | (2006.01) | |
| F22B 1/00 | (2006.01) | |

(52) U.S. Cl.
CPC .............. C25B 1/04 (2013.01); C01B 3/02 (2013.01); C01B 5/00 (2013.01); F01K 25/005 (2013.01); F22B 1/003 (2013.01); Y02E 10/10 (2013.01); Y02E 60/366 (2013.01); Y02E 70/10 (2013.01)

(58) Field of Classification Search
CPC .... C01B 3/02; C01B 5/00; C25B 1/04; Y02E 10/10; Y02E 60/366; Y02E 70/10
See application file for complete search history.

(56) References Cited

U.S. PATENT DOCUMENTS

| | | | |
|---|---|---|---|
| 3,954,592 A | * | 5/1976 | Horvath ................ C25B 1/04 204/229.7 |
| 4,004,067 A | | 1/1977 | Briggs et al. |
| 4,144,147 A | | 3/1979 | Jarrett et al. |
| 4,358,291 A | | 11/1982 | Cuomo et al. |
| 4,394,293 A | | 7/1983 | Gratzel et al. |

(Continued)

FOREIGN PATENT DOCUMENTS

| | | |
|---|---|---|
| EP | 1249052 B1 | 4/2009 |
| EP | 2360230 A1 | 8/2011 |

(Continued)

OTHER PUBLICATIONS

Kanoglu, et al., "Thermodynamic Analysis of Models used in Hydrogen Production by Geothermal Energy", International Journal of Hydrogen Energy, vol. 35, 2010, pp. 8783-8791.*

(Continued)

*Primary Examiner* — Lorne Meade
(74) *Attorney, Agent, or Firm* — Haverstock & Owens LLP

(57) ABSTRACT

A method of and apparatus for producing electricity, hydrogen gas, oxygen gas, pure water using a geothermal heat are disclosed. A low voltage (such as less than 0.9V) is applied to a prepared solution containing hydrogen generating catalysts to generate hydrogen and oxygen. The hydrogen and oxygen are used to drive a gas turbine to generate electricity. The oxygen and hydrogen are combusted to generate heat and pure water. This process is advantageous in many aspects including desalinating salt/sea water using geothermal heat.

17 Claims, 3 Drawing Sheets

(56) References Cited

U.S. PATENT DOCUMENTS

| | | | |
|---|---|---|---|
| 4,454,427 | A | 6/1984 | Sosnowski et al. |
| 5,219,671 | A | 6/1993 | Parker et al. |
| 5,796,799 | A | 8/1998 | Kobayashi et al. |
| 6,306,917 | B1 | 10/2001 | Bohn et al. |
| 6,843,903 | B2 | 1/2005 | Roe et al. |
| 6,991,719 | B2 * | 1/2006 | Ovshinsky ............... C25B 1/02 205/637 |
| 7,125,480 | B2 | 10/2006 | Austin |
| 7,178,339 | B2 * | 2/2007 | Goldmeer ............... B63G 8/10 60/39.53 |
| 7,252,806 | B1 | 8/2007 | Merritt |
| 7,875,166 | B2 | 1/2011 | Matthai et al. |
| 7,989,507 | B2 | 8/2011 | Rising |
| 2001/0046113 | A1 | 11/2001 | Schmidt |
| 2002/0048548 | A1 | 4/2002 | Chaklader |
| 2002/0155330 | A1 * | 10/2002 | Tanaka .................. C25B 1/12 429/422 |
| 2004/0265678 | A1 | 12/2004 | Hommura et al. |
| 2005/0051439 | A1 | 3/2005 | Jang |
| 2005/0269211 | A1 * | 12/2005 | Zachar .................. C25B 1/04 205/637 |
| 2006/0102468 | A1 | 6/2006 | Monzyk et al. |
| 2006/0118428 | A1 | 6/2006 | Baltrucki et al. |
| 2006/0180464 | A1 | 8/2006 | Griffin |
| 2006/0188436 | A1 | 8/2006 | Griffin |
| 2006/0249393 | A1 | 11/2006 | Ghosh et al. |
| 2007/0072949 | A1 | 3/2007 | Ruud et al. |
| 2007/0244208 | A1 | 10/2007 | Shulenberger et al. |
| 2008/0296172 | A1 * | 12/2008 | Davidson ................. C25B 1/04 205/639 |
| 2009/0074611 | A1 | 3/2009 | Monzyk et al. |
| 2009/0101520 | A1 | 4/2009 | Zhang et al. |
| 2009/0110976 | A1 | 4/2009 | Yoshida et al. |
| 2009/0115190 | A1 | 5/2009 | Devine |
| 2009/0152126 | A1 | 6/2009 | Griffin |
| 2009/0277799 | A1 | 11/2009 | Grimes et al. |
| 2010/0000874 | A1 | 1/2010 | Hinman et al. |
| 2010/0004495 | A1 | 1/2010 | Fareid et al. |
| 2010/0005809 | A1 * | 1/2010 | Anderson ................. F02C 1/02 60/780 |
| 2010/0133111 | A1 | 6/2010 | Nocera et al. |
| 2010/0224502 | A1 | 9/2010 | Hammar et al. |
| 2011/0041740 | A1 | 2/2011 | Reilly |
| 2011/0114075 | A1 | 5/2011 | Mills |
| 2013/0277231 | A1 | 10/2013 | Greenberg |
| 2013/0281553 | A1 | 10/2013 | Kubic et al. |

FOREIGN PATENT DOCUMENTS

| | | |
|---|---|---|
| WO | 8910981 | 11/1989 |
| WO | 2010084358 A2 | 7/2010 |
| WO | 2011002527 A1 | 1/2011 |
| WO | 2012062529 A1 | 5/2012 |

OTHER PUBLICATIONS

Hand, Theodore, W., "Hydrogen Production Using Geothermal Energy" (2008), All Graduate Theses and Dissertations, Paper 39, accessed at http://digitalcommons.usu.edu/etd/39 on Apr. 16, 2016.*

"The Jet Engine", Third Edition, Rolls-Royce Limited, 1969, pp. 9-14.*

Peters, W.G., "Colloidal Silver Chemistry", http://www.wgpeters.com//colloidal-silver-chemistry//, pp. 1-3.

Hydrogen Production—Wikipedia, the free encylopedia, pp. 4-7, http://en.wikipedia.org/wiki/Hydrogen_production.

Venere, Emil, "New Process Generates Hydrogen From Aluminum Alloy to Run Engines, Fuel Cells", Purdue University, http://news.uns.purdue.edu/x/2007a/070515WoodallHydrogen.html, May 15, 2007.

Perret, Robert, "II.F.1 Development of Solar-Powered Thermochemical Production of Hydrogen from Water", DOE Hydrogen Program, FY 2007 Annual Progress Report, pp. 128-135.

Kim, MingJoong et al., "Hydrogen generation from hydrolysis reaction through corrosion of Al—Cu alloy in alkaline water", Dep. or Material Science and Engineering.

"Bayer process", http://en.wikipedia.org/wiki/Bayer_process, pp. 1-2.

Soler, Lluis et al., "Aluminum and aluminum alloys as sources of hydrogen for fuel cell applications", Journal of Power Sources, 2007, www.sciencedirect.com, www.elsevier.com/locate/jpowsour, pp. 144-149.

Frederick Lowenheim, "Electroplating", McGraw-Hill Book Company, New York 1979, p. 12-25.

David R. Lide et al., "CRC Handbook of Chemistry and Physics 76th Eddition", New York 1195-1996, p. 8-58.

Currao et al., Water Splitting with Silver Chloride Photoanodes and Amorphous Silicon solar Cells. Photochemical and Photobiological Sciences, vol. 3, 2004, [retrieved on Nov. 19, 2013], Retrieved from the Internet. <URL:http://www.gioncalzaferri.ch/publikationen/Photochem_Photobiol_Sci_2004_3_1017%20Watersplitting.pdf>. entiredoucment.

* cited by examiner

HYDROGEN GENERATING SYSTEM AND METHOD USING GEOTHERMAL ENERGY

CROSS-REFERENCE TO RELATED APPLICATIONS

This application claims priority under 35 U.S.C. § 119(e) of the U.S. Provisional Patent Application Ser. No. 61/733,868, filed Dec. 5, 2012 and titled, "Hydrogen Generating System and Method Using Geothermal Energy," which is hereby incorporated by reference in its entirety for all purposes.

FIELD OF THE INVENTION

The present invention relates to hydrogen and oxygen production. More specifically, the present invention relates to hydrogen and oxygen production using geothermal heat, water, and an environmentally safe catalyst.

BACKGROUND OF THE INVENTION

Typical methods and devices for desalinating sea/salt water require much energy to push the salt water through an ion exchange membrane. Distillation of salt water is inefficient in terms of its energy use. More energy efficient methods and device for desalination are needed.

SUMMARY OF THE INVENTION

Methods of and apparatuses for producing $H_2$ and $O_2$ from salt water using geothermal heat are disclosed. In one aspect, the apparatus comprises a main reactor, a gas turbine, and a source of geothermal heat.

In one aspect, a method of desalination comprising applying a voltage to a solution containing sodium chloride and a hydrogen producing catalyst, generating an amount of hydrogen with the hydrogen producing catalyst, and generating an amount of pure water by combusting the amount of hydrogen and oxygen. In some embodiments, the method further comprises providing geothermal heat. In other embodiments, the voltage is equal or less than 1V. In some other embodiments, the solution comprises water having salt. In some embodiments, the solution comprises sea water. In some other embodiments, the hydrogen producing catalyst contains aluminum, silver, and copper. In some embodiments, the oxygen is generated by the hydrogen producing catalyst. In other embodiments, the method further comprises driving an electricity generating turbine using the hydrogen generated.

In another aspect, a hydrogen producing system comprises a non-acidic solution containing a hydrogen generating catalyst, wherein the hydrogen generating catalyst contains a charge-treated aluminum metal, a charge-treated copper metal, and a charged-treated silver metal, wherein the charge-treated aluminum, copper, and silver metals are treated by a voltage not less than 1V, and wherein the hydrogen generating catalyst is capable of generating hydrogen gas in a catalytic manner with an applied voltage no greater than 1V, an electric energy providing device, and a geothermal heating device providing heat to the non-acidic solution.

In some embodiments, the system comprises a light source. In other embodiments, the light source comprises LED. In some other embodiments, the light source provides lights having wavelengths approximately in the visible light region. In some embodiments, the geothermal heating device receives a amount of geothermal heat from the earth. In other embodiments, the hydrogen generating catalyst comprises aluminum hydroxide. In some other embodiments, the hydrogen generating catalyst comprises copper hydroxide. In some embodiments, the hydrogen generating catalyst comprises silver hydroxide. In other embodiments, the system further comprises a computer automating a transportation of the non-acidic solution.

In another aspect, a method of generating electricity comprises applying a voltage less than 1V to a solution having a catalyst, wherein the catalysts containing aluminum complex, copper complex, and silver complex, and providing heat from a geothermal heat source to the solution. In some embodiments, the solution is a non-acidic solution. In other embodiments, the solution has a pH value equal or great than 7. In some other embodiments, the method further comprises turning a turbine to generate electricity by using one or more gases that are generated at the solution. In some embodiments, the method further comprises using the electricity generated as an energy source to be applied to the solution. In other embodiments, the one or more gases comprise hydrogen, oxygen, or a combination thereof. In some other embodiments, the method further comprises combusting the hydrogen and oxygen to generate heat and water. In some embodiments, the method further comprises transporting the heat and the water to add to the solution.

In another aspect, a hydrogen generating method comprises generating hydrogen gas and oxygen gas by applying a pulsed voltage less than 1V to a solution, wherein the solution containing a catalyst having aluminum, copper, and silver, and heating the solution by a geothermal heat and a heat generated by combusting the hydrogen gas and the oxygen gas.

In some embodiments, the method further comprises regenerating the catalyst by providing an amount of light. In other embodiments, the light comprises LED.

DETAILED DESCRIPTION OF THE PREFERRED EMBODIMENT

Figure 1:
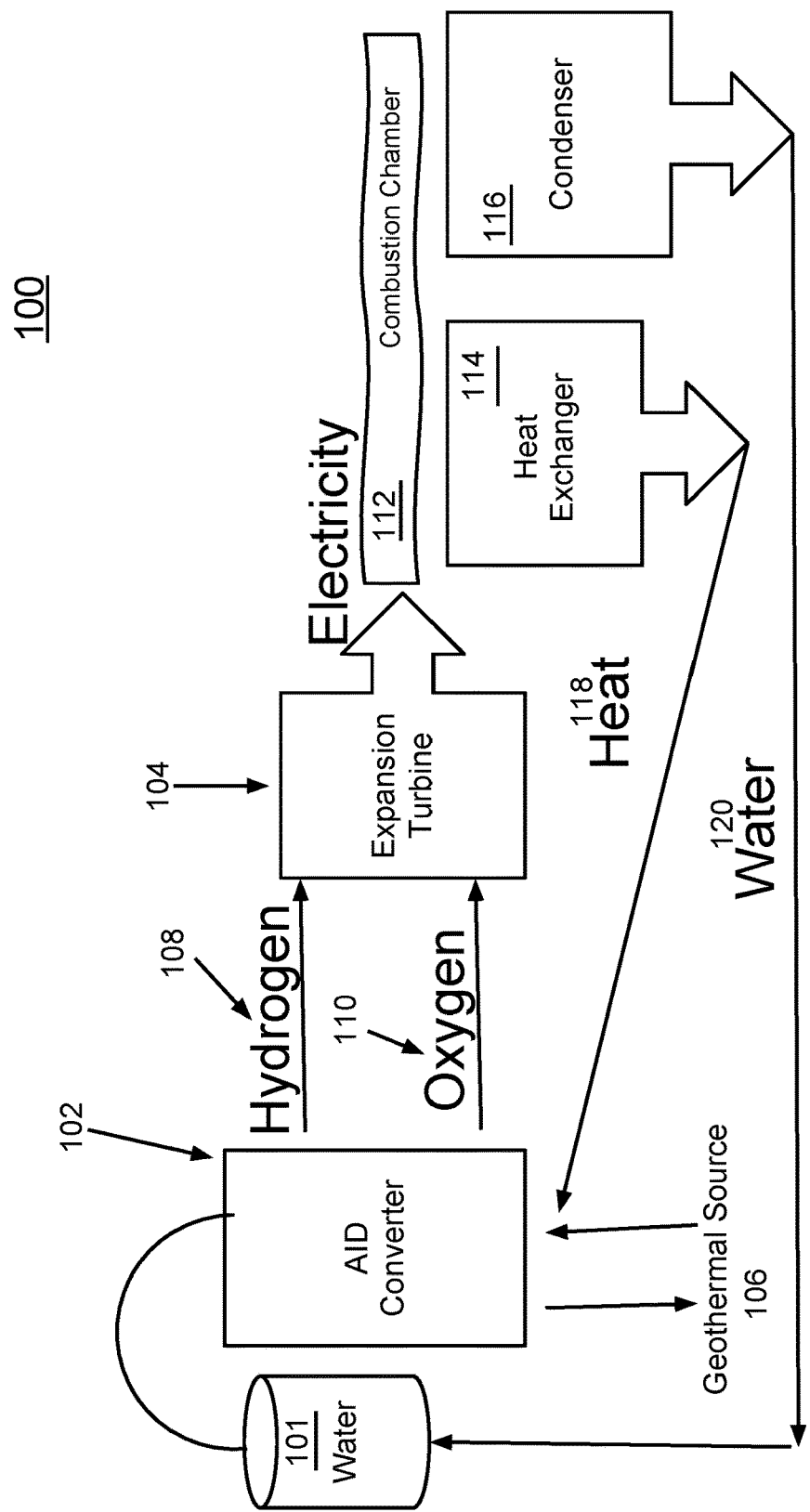
FIG. 1 illustrates a hydrogen producing system in accordance with some embodiments.

FIG. 1 illustrates a hydrogen producing system 100 in accordance with some embodiments. The hydrogen producing system 100 is able to use geothermal heat as the heat source for chemical reactions. In some embodiments, the hydrogen producing system 100 comprises a reactor 102. The reactor 102 allows an active ion displacement reaction to occur. In some embodiments, the chemical reactions in the reactor 102 generate hydrogen gas and oxygen gas. Details of the compositions, starting materials, and catalysts that are used in the reactor 102 are described in the following. In some embodiments, the hydrogen gas producing reaction occurs in the reactor 102. A heat source 106, such as a geothermal source, having heat to be provided to the reactor 102. The geothermal source is able to provide/supply heat to the reactor 102. The geothermal heat is able to be pre-stored before providing heat to the reactor 102. A person of ordinary skill in the art appreciates that any other sources of heat from nature are within the scope of the present invention. The water source of the reaction is able to be from the water tank 101. The hydrogen producing reaction in the reactor 102 generates hydrogen gas 108 and oxygen gas 110. The hydrogen gas 108 and oxygen gas 110 are sent to drive a gas turbine 104 to generate electricity by using the gas pressure/gas flow generated at the hydrogen producing reaction. The hydrogen gas 108 and the oxygen gas 110, after passing through the gas turbine 104, are triggered to be combusted/reacted at a combustion chamber 112. The hydrogen gas is able to react with the oxygen gas by using electric sparks. Heat that is generated through reacting hydrogen gas 108 and the oxygen gas 110 is able to be transferred to a heat exchanger 114, which is able to be applied back to the reactor 102 for recycling and reusing the heat. The combustion reaction of the oxygen gas 110 and the hydrogen gas 108 produces pure water, which is able to be condensed and collected at the condenser 116, such that the system 100 is able to be used as a desalination device to produce pure water. In some embodiments, the water is able to be recycled back to the reactor 102, so no new water or external water is needed for continuously running the hydrogen producing reaction.

Figure 2:
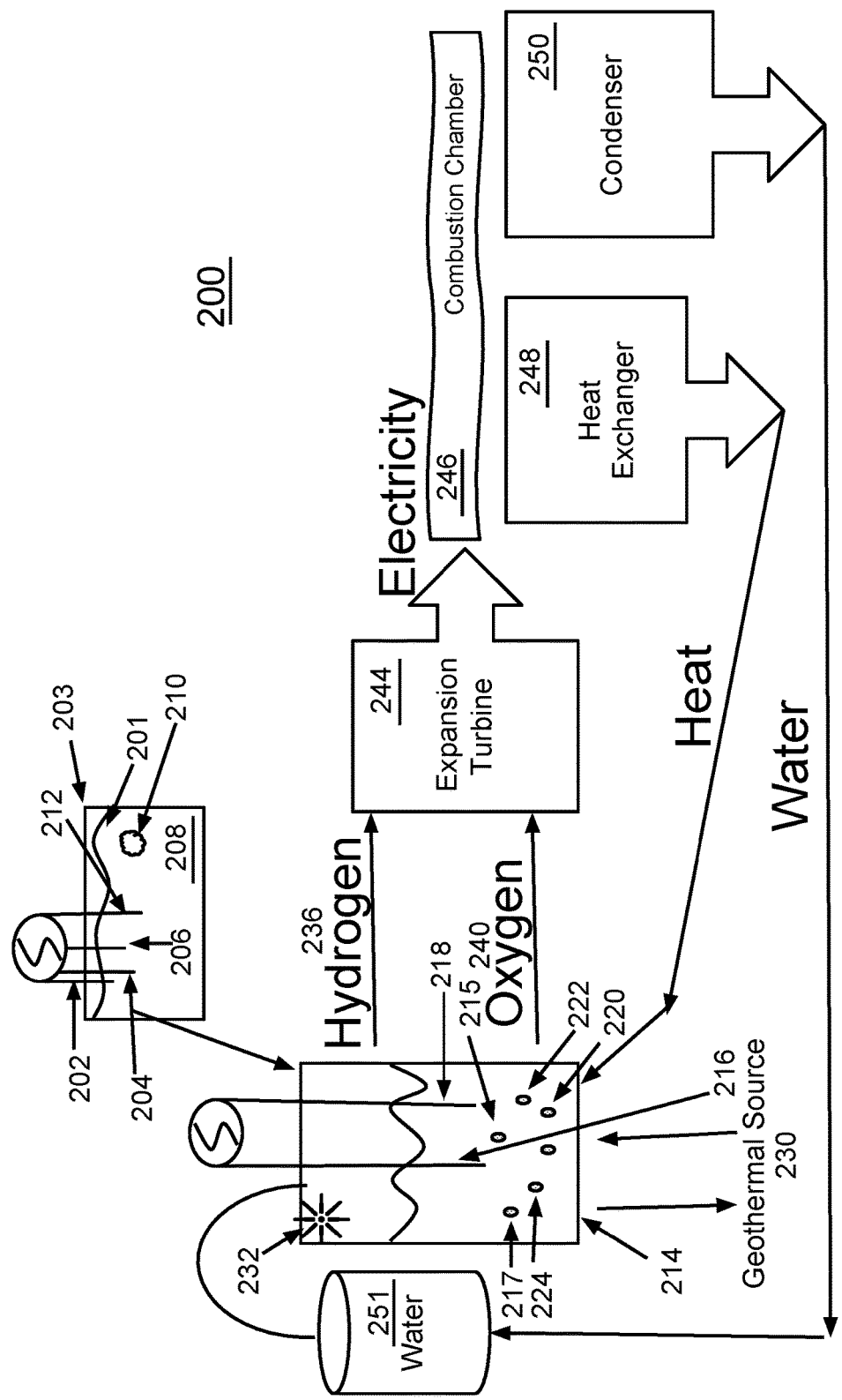
FIG. 2 illustrates another hydrogen producing system in accordance with some embodiments.

FIG. 2 illustrates a hydrogen producing system 200 in accordance with some embodiments. In some embodiments, the system 200 comprises a preparation reactor 203 and a main reactor 214. The main reactor 214 comprises a photochemical/oxidizer reacting device 232, and a thermal source 230, which is able to be a geothermal source. A hydrogen producing reaction is able to begin from preparing a solution 201 containing Al metal 202 (250 mg), Cu metal 204 (250 mg), Ag metal 206 (250 mg), a graphite electrode 212 and 1 liter of water 208 having 1.5% NaCl 210 by weight. A negative voltage −2.5V is applied to the graphite electrode 212 and a first positive voltage 1.7V is applied to the Al metal 202 for 15 minutes.

Next, the first positive voltage applied to the Al metal 202 is removed, and a second positive voltage of 1.4V is applied to the Cu metal 204 for 10 minutes while the negative voltage of −2.5V is applied to the graphite electrode 212. Next, the second positive voltage is removed from the Cu metal 204, and a third positive voltage of 1.0V is applied to the Ag metal 206 for 5 minutes with the negative voltage still applied to the graphite electrode 212. The temperature of the solution is maintained at 88° F. by controlling the heat source 230.

Next, the solution 201 is transferred to the main reaction vessel 214, so that the main reaction vessel 214 contains aluminum complex 215, copper complex 217, silver complex 220, sodium ions 222, and chloride ions 224 from the preparation vessel 203. Water is able to be input from a water tank 251. The term "complex" comprises all ligand states of a metal. For example, an aluminum complex includes $Al^{3+}$ or $Al(OH)_x$, where the x represents the coordinated ligand numbers of the aluminum ion. In some embodiments, a voltage between 0.4V and 0.9V is applied to the cathode of the electrodes. In alternative embodiments, a voltage of 0.85V is applied to the cathode of the electrodes. In other embodiments, a voltage not exceeding 0.9V is applied to the cathode of the electrodes. Some experiments indicate that hydrogen production is reduced when a voltage exceeding 0.9V is applied. In some embodiments, the applied voltage of the anode is at 0V compared with a voltage on the standard hydrogen electrode. In some embodiments, the voltage is applied in a way that a negative charge is applied to the stainless steel electrode 216 and a positive charge is applied to the graphite electrode 218. A hydrolysis reaction begins to occur when sufficient voltage is applied, and hydrogen gas 236 is generated at the stainless steel electrode 216 when the voltage is applied to the stainless steel electrode 216 and the graphite electrode 218. While the hydrogen producing reaction is going, heat is provided through the heat source 230 and lightings 232 (such as, LED lights) are applied to the main reactor 214 for assisting a photolysis reaction.

Oxygen gas 240 and hydrogen gas 236 are output to the gas turbine 244 to generate electricity. The oxygen gas 240 and the hydrogen gas 236 are able to react at the combustion chamber 246 to generate electricity through a combustion reaction. The heat generated at the combustion chamber 246 is able to be collected at the heat exchanger 248 and the water generated is able to be collected at the condenser 250. The water collected at the condenser 250 is able to be used as pure water or recycled back to the main reactor 214. The whole reaction is able to be automatically controlled by a computer system to maintain a continuous operation of the reaction, including maintaining an optimized reaction condition for the hydrogen producing reaction.

Figure 3:
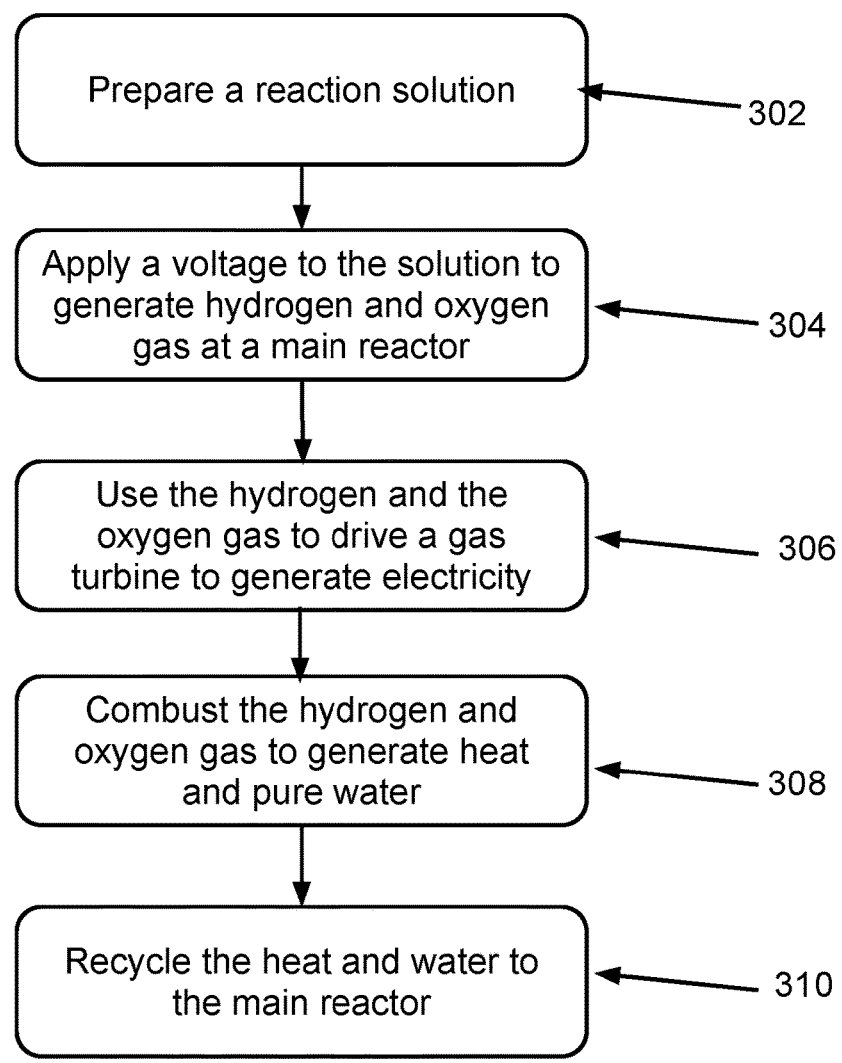
FIG. 3 is a flow chart illustrating a hydrogen producing process using geothermal as a heat source in accordance with some embodiments.

FIG. 3 is a flow chart illustrating a hydrogen producing process 300 using geothermal as a heat source. The process 300 is able to begin from preparing a reaction solution at Step 302. The solution preparation is able to be performed at the preparation reactor 203 (FIG. 2) with the procedures described above. At Step 304, voltage is applied to the solution to generate hydrogen gas and oxygen gas. At Step 306, the hydrogen gas and the oxygen gas are sent to a gas turbine to generate electricity. At Step 308, the hydrogen gas and the oxygen gas are combusted to generate heat and pure water. At Step 310, the heat and water is recycled back to the main reactor for running the reaction. All the steps that are contained in the methods/procedures described above are some embodiments of the present application. All the steps are optional and all the steps when applicable are able to be performed in any sequences or orders. Additional steps are also able to be added when a person skilled in the art deems proper.

The systems and procedures are able to be utilized to produce electricity, hydrogen, oxygen, pure water on-demand using a geothermal heat. In operation, a low voltage (such as less than 0.9V) is applied to a prepared solution having active catalysts (hydrogen generating substances) to generate hydrogen and oxygen. The hydrogen and oxygen are used to move a gas turbine to generate electricity. The oxygen and hydrogen are combusted to generate heat and pure water. This process is advantageous in many aspects including desalinating salt/sea water using a geothermal heat.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of desalination comprising:
   a. performing catalytic electrolysis in a reaction vessel by applying a voltage to a solution containing sea water, sodium chloride and a hydrogen producing catalyst;
   b. generating an amount of oxygen and an amount of hydrogen with the hydrogen producing catalyst;

c. combining the amount of oxygen and the amount of hydrogen together to drive a turbine to generate an amount of electricity by using a gas pressure of the amount of hydrogen and the amount of oxygen;

d. using the electricity for performing the catalytic electrolysis;

e. using the amount of hydrogen and the amount of oxygen generated at the electrolysis reaction as intermediate reaction products and generating an amount of pure water by combusting the amount of hydrogen and the amount of oxygen after the turbine was driven to generate the amount of electricity;

f. recycling an amount of recycled heat generated, by combusting the amount of hydrogen and the amount of oxygen, directly back to a reaction vessel containing the solution;

g. recycling the amount of pure water from a condenser back to the reaction vessel, wherein the pure water is separately recycled back to the reaction vessel from the amount of recycled heat;

h. combining the amount of recycled heat and an amount of heat from a geothermal heat as a heat source for the performing the catalytic electrolysis; and i. desalinating the sea water using the catalytic electrolysis of the sea water with the geothermal heat and the recycled heat to produce the amount of pure water, the amount of hydrogen, the amount of oxygen, or a combination thereof.

2. The method of claim 1, wherein the voltage is equal or less than 1V.

3. The method of claim 1, wherein the hydrogen producing catalyst comprises aluminum, silver, and copper.

4. The method of claim 1, wherein the oxygen is generated by the hydrogen producing catalyst.

5. A method of generating electricity comprising:

a. performing catalytic electrolysis by applying a voltage less than 1V to a solution having a catalyst and sea water, wherein the catalyst containing aluminum complex, copper complex, and silver complex;

b. providing geothermal heat to the solution;

c. generating hydrogen and oxygen from the solution by the catalytic electrolysis;

d. combining the oxygen and the hydrogen together to drive a turbine to generate an amount of electricity by using a gas pressure of the hydrogen and the oxygen;

e. using the amount of electricity for performing the catalytic electrolysis;

f. using the hydrogen and the oxygen generated from the catalytic electrolysis as intermediate reaction products and generating an amount of pure water and an amount of heat by combusting the hydrogen and the oxygen;

g. recycling an amount of recycled heat generated at the combusting the hydrogen and the oxygen back to a reaction vessel containing the solution;

h. recycling the amount of pure water from a condenser back to the reaction vessel, wherein the pure water is separately recycled back to the reaction vessel from the amount of recycled heat;

i. combining the amount of recycled heat and an amount of heat from the geothermal heat as a heat source for performing the catalytic electrolysis; and j. desalinating the sea water using the catalytic electrolysis of the sea water with the amount of geothermal heat and the amount of recycled heat.

6. The method of claim 5, wherein the solution is a non-acidic solution.

7. The method of claim 5, wherein the solution has a pH value equal or great than 7.

8. The method of claim 5, further comprising transporting the amount of recycled heat and the amount of pure water to be added to the solution.

9. A hydrogen generating method comprising:

a. performing catalytic electrolysis by applying a pulsed voltage less than 1V to a solution to generate hydrogen and oxygen, wherein the solution containing sea water and a catalyst having aluminum, copper, and silver;

b. combining the oxygen and the hydrogen together to drive a turbine to generate an amount of electricity by using a gas pressure of the hydrogen and oxygen;

c. using the amount of electricity for performing the catalytic electrolysis;

d. heating the solution by a geothermal heat and a recycled heat generated by combusting the hydrogen and the oxygen;

e. using the hydrogen and the oxygen generated from the catalytic electrolysis as intermediate reaction products and generating an amount of pure water by combusting the hydrogen and the oxygen;

f. recycling an amount of recycled heat generated by combusting the hydrogen and the oxygen back to a reaction vessel containing the solution;

g. recycling the amount of pure water from a condenser back to the reaction vessel, wherein the pure water is separately recycled back to the reaction vessel from the recycled amount of heat;

h. combining the amount of recycled heat and an amount of heat from a geothermal heat source as a heat source for the performing catalytic electrolysis; and i. decomposing the sea water using the catalytic electrolysis of the sea water with the amount of geothermal heat and the amount of recycled heat.

10. The method of claim 9, further comprising regenerating the catalyst by providing an amount of light.

11. The method of claim 10, wherein the light comprises LED.

12. A catalytic water electric hydrolysis system comprising:

a. a non-acidic solution containing sea water and a hydrogen generating catalyst, wherein the hydrogen generating catalyst contains a charge-treated aluminum metal, a charge-treated copper metal, and a charged-treated silver metal that are treated by a voltage not less than 1V, and wherein the hydrogen generating catalyst is capable of generating hydrogen gas and oxygen gas in a catalytic manner with an applied voltage no greater than 1V, wherein the hydrogen gas and the oxygen gas are intermediate reaction products generated at a catalytic electrolysis of a desalination process, wherein the hydrogen gas and the oxygen gas are combusted to generate an amount of pure water;

b. an electric energy providing device providing the voltage to the non-acidic solution, wherein the voltage is generated by a turbine driven by combined the hydrogen and oxygen gas by using a gas pressure of the hydrogen and oxygen gas; and c. a surface of a reaction vessel providing geothermal heat to the non-acidic solution, wherein the geothermal heat is combined with a recycled heat from the combusted hydrogen gas and oxygen gas to heat a reaction of the catalytic electrolysis, thereby the sea water is decomposed by using the catalytic electrolysis of the sea water with the geothermal heat and the recycled heat, wherein the pure water from a condenser is recycled back to the reaction vessel, wherein the pure water is separately recycled back to the reaction vessel from the recycled heat.

13. The system of claim 12, further comprising a light source.

14. The system of claim 13, wherein the light source comprises LED.

15. The system of claim 14, wherein the light source provides lights having wavelengths approximately in the visible light region.

16. The system of claim 12, wherein the hydrogen generating catalyst comprises aluminum hydroxide, copper hydroxide, silver hydroxide, or a combination thereof.

17. The system of claim 12, further comprising a computer automating a transportation of the non-acidic solution.

* * * * *